United States Patent
Landström et al.

(10) Patent No.: US 12,231,206 B2
(45) Date of Patent: Feb. 18, 2025

(54) METHODS AND APPARATUSES FOR ADJUSTING A SET OF CANDIDATE BEAMS

(71) Applicant: Telefonaktiebolaget LM Ericsson (PUBL), Stockholm (SE)

(72) Inventors: Anders Landström, Boden (SE); Kjell Larsson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 386 days.

(21) Appl. No.: 17/639,651

(22) PCT Filed: Sep. 10, 2019

(86) PCT No.: PCT/EP2019/074104
§ 371 (c)(1),
(2) Date: Mar. 2, 2022

(87) PCT Pub. No.: WO2021/047760
PCT Pub. Date: Mar. 18, 2021

(65) Prior Publication Data
US 2022/0294513 A1    Sep. 15, 2022

(51) Int. Cl.
*H04B 7/06* (2006.01)
*H04B 17/318* (2015.01)

(52) U.S. Cl.
CPC ......... *H04B 7/0695* (2013.01); *H04B 7/0617* (2013.01); *H04B 17/318* (2015.01)

(58) Field of Classification Search
CPC ... H04B 7/0695; H04B 17/318; H04B 7/0617
(Continued)

(56) References Cited

U.S. PATENT DOCUMENTS

2015/0010112 A1    1/2015  Liu et al.
2017/0078001 A1*   3/2017  Kim .................... H04B 7/0871
(Continued)

FOREIGN PATENT DOCUMENTS

WO    2019 120523 A1    6/2019
WO    2019 129006 A1    7/2019

OTHER PUBLICATIONS

PCT Notification of Transmittal of the International Search Report and the Written Opinion of the International Searching Authority, or the Declaration issued for International application No. PCT/EP2019/074104—May 13, 2020.
(Continued)

*Primary Examiner* — Xuan Lu
(74) *Attorney, Agent, or Firm* — Baker Botts L.L.P.

(57) ABSTRACT

Embodiments described herein relate to methods and apparatuses for adjusting a set of candidate beams that a wireless device is to perform measurements on. A method comprises obtaining an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam; comparing the estimated gain value to an expected gain value associated with the first narrow beam; and based on the comparison, determining whether to adjust which beams belonging to the candidate set of beams.

20 Claims, 8 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2017/0237477 A1* | 8/2017 | Fujio | .................... | H04B 7/0617 |
| | | | | 370/329 |
| 2019/0082346 A1* | 3/2019 | Tang | .................... | H04B 7/0626 |
| 2019/0379442 A1* | 12/2019 | Chen | ...................... | H04B 7/088 |
| 2020/0136680 A1* | 4/2020 | Kim | ...................... | H04L 1/1819 |
| 2021/0013954 A1* | 1/2021 | Zhao | .................... | H04L 5/0023 |
| 2021/0185547 A1* | 6/2021 | Zhao | .................... | H04B 7/0617 |

OTHER PUBLICATIONS

EPO Communication Pursuant to Article 94(3) EPC Issued for Application No. 19 768 765.0-1206—Aug. 23, 2023.

\* cited by examiner

METHODS AND APPARATUSES FOR ADJUSTING A SET OF CANDIDATE BEAMS

PRIORITY

This nonprovisional application is a U.S. National Stage Filing under 35 U.S.C. § 371 of International Patent Application Serial No. PCT/EP2019/074104 filed Sep. 10, 2019 and entitled "METHODS AND APPARATUSES FOR ADJUSTING A SET OF CANDIDATE BEAMS" which is hereby incorporated by reference in its entirety.

TECHNICAL FIELD

The present disclosure relates to beam management in a wireless communications network, in general, and more specifically, to a method and apparatus for for adjusting a set of candidate beams that a wireless device is to perform measurements on.

BACKGROUND

Beamforming of data and control signaling is an important aspect in New Radio (NR) networks. In beamforming, multiple antenna elements are used to amplify a signal in a spatial direction by constructive interference, resulting in a directional gain and thereby a certain beam shape. An array of antennas may be used to provide multiple beams. A predefined setup of such beams is referred to as a Grid of Beams (GoB).

The long-term channel properties of a wireless device may change with mobility. In other words, as the wireless device moves the network may need to switch which beam from the GoB to use for data transmissions to the wireless device. Beam management considers the process of determining a suitable beam to transmit or receive data on.

In NR, 3GPP has standardized multiple reference signal measurements and reports to enable beam management, these include Channel State Information Reference Signals (CSI-RS) and CSI-RS specifically for Beam Management (CSI-RS-BM). In addition, the wireless devices may report on the Synchronization Signal Block (SSB) which is periodic in time but may be transmitted on multiple beams. The SSB defines the downlink coverage of the network but since each SSB is associated with a static overhead loss, they may be beamformed with fewer beams than what is used for data. Typical configurations involve forming one or a few wide beams per sector for SSB, while the full beamforming gain is used for data beams.

One wide beam will usually cover several narrower data beams. Herein, a wide beam may be referred to as a parent beam, and the narrower data beams covered by the wide beam may be consequently referred to as child beams of the parent beam. In the general case narrow child beam may have more than one parent beam (in other words, a narrow beam may be covered by more than one wide beam). Child beams covered by the same parent beam may be referred to as sibling beams.

Figure 1:
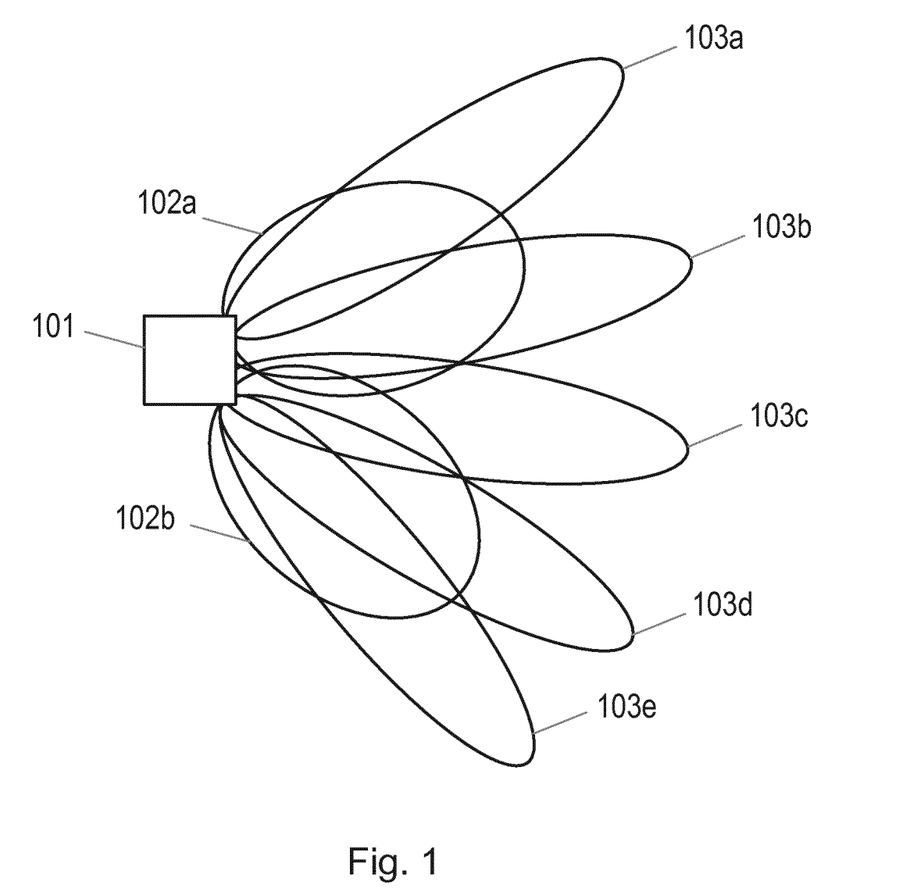
FIG. 1 illustrates an example of a base station providing a plurality of beams.

FIG. 1 illustrates an example of a base station 101 providing a plurality of beams.

The wide beams 102a and 102b may therefore be parent beams. The narrow beams 103a and 103b are child beams of the wide beam 102a, and the narrow beams 103c, 10d and 103e are child beams of the wide beam 102b. Beam 103c may also be considered a child beam of beam 102b.

A network node (e.g. a gNB) using a GoB may search the beam space for a suitable narrow beam on which to transmit data to a wireless device by transmitting a reference signal (e.g. CSI-RS-BM) in a set of candidate beams. The set of candidate beams may comprise narrow beams, or child beams.

The wireless device may be instructed to perform measurements on the beamformed CSI-RS-BM received on each of the set of candidate beams, and may be instructed to report up to N (e.g. 4) best quality values (with corresponding CSI-RS-BM resource ID) back to the network.

Herein, one such iteration, i.e. the process of transmitting a set of candidate beams and retrieving a corresponding measurement report containing information relating to at least one of the set of candidate beams, may be referred to as a beam sweep. Once the beam sweep is complete the network may decide on which beam to use as a serving data beam for the wireless device, and which beams to try as beam candidates in the next beam sweep.

Current solutions for a beam sweep involve testing a number of beam candidates using different algorithms, all beams (normally a costly approach), random schemes, a closest neighbor search, or hierarchical schemes where candidates are selected as children of the current best wide beam (given by e.g. SSB reports).

SUMMARY

According to some embodiments there is provided a method for adjusting a set of candidate beams that a wireless device is to perform measurements on. The method comprises obtaining an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam; comparing the estimated gain value to an expected gain value associated with the first narrow beam; and based on the comparison, determining whether to adjust which beams belonging to the candidate set of beams.

According to some embodiments there is provided a method, for use in adjusting a set of candidate beams that a wireless device is to perform measurements on. The method comprises measuring a value indicative of a first received energy of a first reference signal received by the wireless device on a first wide beam; measuring a value indicative of a second received energy of a second reference signal received by the wireless device on a first narrow beam; calculating an estimated gain value associated with a first narrow beam based on the value indicative of the first received energy and the value indicative of the second received energy; and transmitting an indication of the estimated gain value to a network node.

According to some embodiments there is provided a network node for adjusting a set of candidate beams that a wireless device is to perform measurements on. The network node comprises a processing circuitry and a memory, said memory containing instructions executable by said processing circuitry whereby said network node is operative to: obtain an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam; compare the estimated gain value to an expected gain value associated with the first narrow beam; and based on the comparison, determine whether to adjust which beams belonging to the candidate set of beams.

According to some embodiments there is provided a wireless device, for use in adjusting a set of candidate beams that a wireless device is to perform measurements on. The wireless device comprises a processing circuitry and a memory, said memory containing instructions executable by said processing circuitry whereby said wireless device is operative to: measure a value indicative of a first received energy of a first reference signal received by the wireless device on a first wide beam; measure a value indicative of a second received energy of a second reference signal received by the wireless device on a first narrow beam; calculate an estimated gain value associated with a first narrow beam based on the value indicative of the first received energy and the value indicative of the second received energy; and transmit an indication of the estimated gain value to a network node.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 2 illustrates a method for adjusting a set of candidate beams that a wireless device is to perform measurements on;

FIG. 3 illustrates a method for use in adjusting a set of candidate beams that a wireless device is to perform measurements on;

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

As described above, in order to determine which beam on which to transmit data to a wireless device, a network node may determine a set of candidate beams for the wireless device to perform measurements on. However, each candidate beam adds an overhead load to the system.

Therefore, which beams to add to the candidate set of beams may become a trade-off between overhead and performance degradation due to suboptimal beam choice caused by user and/or environment mobility.

Thus, on one hand it may be acceptable to accept a large overhead and test a lot of beam candidates such that a wireless device (for example, a wireless device with fast-moving channel properties) is always covered by their best beam. However, in other circumstances, a large overhead may not be acceptable, and the number of candidate beams may be limited risking choosing a bad beam for communication, possibly leading to a beam failure.

Figure 2:
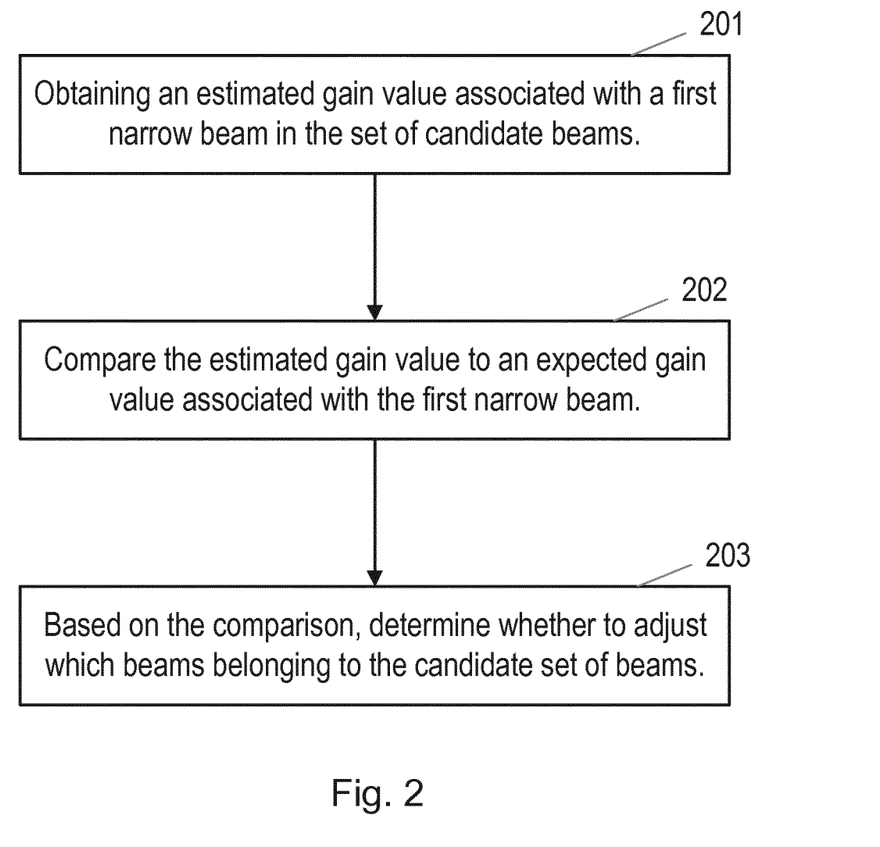

FIG. 2 illustrates a method for adjusting a set of candidate beams that a wireless device is to perform measurements on. The wireless device may be configured to receive signals from a base station on one or more beams. In some examples, the method is performed by a network node. In some examples, the network node comprises the base station in communication with the wireless device.

In step 201 the network node obtains an estimated gain value $G_{est}$ associated with a first narrow beam in the set of candidate beams, wherein the estimated gain value is determined is based on a value indicative of first received energy of a first reference signal received by the wireless device on a first wide beam and a value indicative of a second received energy of a second reference signal received by the wireless device on the first narrow beam.

For example, for a candidate set of beams, a wireless device may perform measurements of the energy of reference signals received on each of the candidate beams.

The wireless device may also perform measurements of the energy of reference signals received on one or more wide beams in a similar way. The one or more wide beams may be parent beams of one or more of the candidate wide beams.

For example, the wireless device may measure the Reference Signal Received Power (RSRP) of a received Channel State Information Reference Signal (CSI-RS) on narrow beams (e.g. data beams). For example, the wireless device may measure the RSRP of a received Synchronization Signal Block (SSB) on wide beams.

In some examples, the wireless device may then transmit a report to the network node comprising an indication of the measured values indicative of the received energy on a predetermined top number of best beams. For example, the wireless device may indicate the measured RSRP values for the top one to four beams.

To determine the estimated gain value $G_{est}$ associated with the first narrow beam, the network node may calculate the estimated gain value $G_{est}$ by subtracting the value indicative of second received energy from the value indicative of first received energy. In some examples, the values indicative of second received energy and/or the first received energy may be adjusted to compensate for a difference in transmission energies of the first wide beam and the first narrow beam. The energies may be expressed in dB. In some examples a ratio may be calculated if the energies are expressed in other units.

In some examples, if a narrow beam has multiple parent beams, a parent beam with highest reported quality value (e.g. RSRP) may be utilized to calculate the estimated gain. In other words, the first wide beam may be the parent beam of the first narrow beam having the highest reported value indicative of the received energy.

In some alternative examples, the wireless device may determine the estimated gain value $G_{est}$ instead of the network node.

Figure 3:
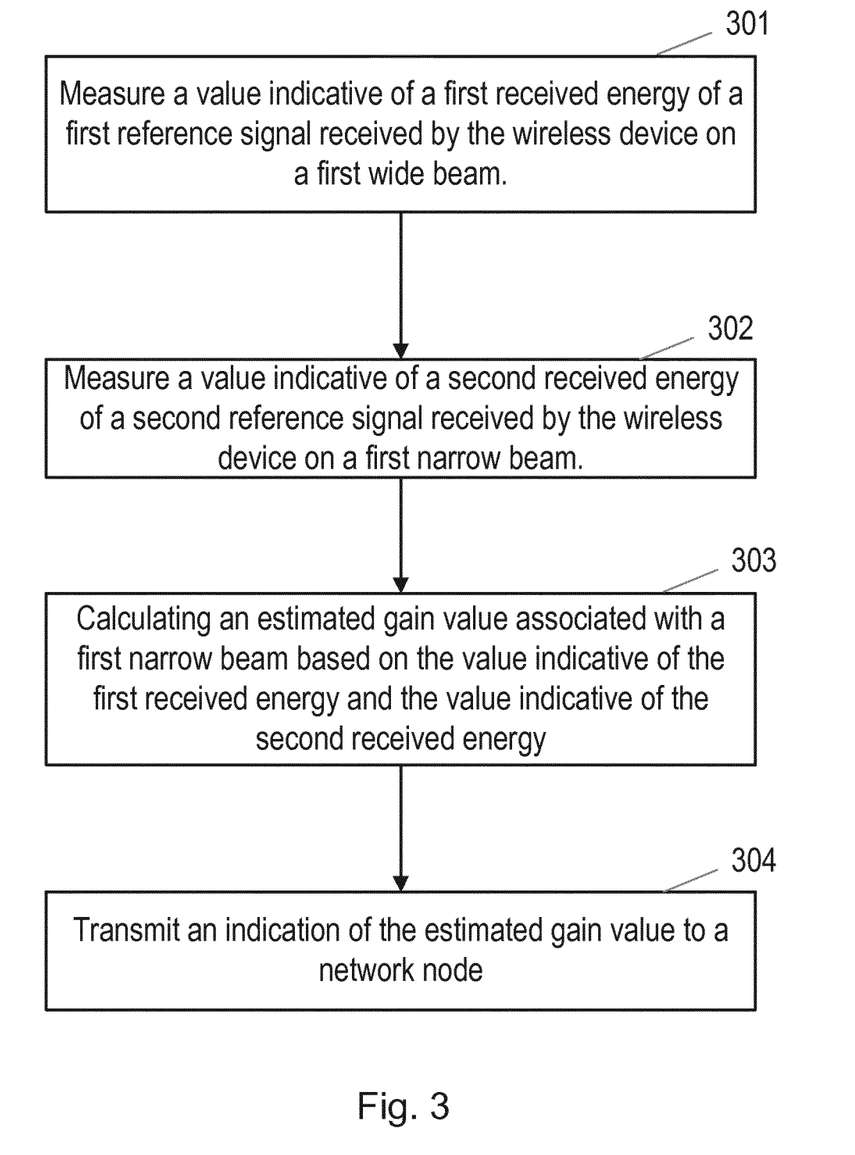

In some examples therefore, the wireless device may perform the method illustrated in FIG. 3.

In step 301, the method comprises measuring a value indicative of a first received energy of a first reference signal received by the wireless device on a first wide beam.

In step 302, the method comprises measuring a value indicative of a second received energy of a second reference signal received by the wireless device on a first narrow beam.

In step 303, the method comprises calculating an estimated gain value associated with a first narrow beam based on the value indicative of the first received energy and the value indicative of the second received energy. Similarly to as described above, the wireless device may calculate the estimated gain value $G_{est}$ by subtracting the second received energy from the first received energy. Again, in some examples, the second received energy and/or the first received energy may be adjusted to compensate for a difference in transmission energies of the first wide beam and the first narrow beam.

In step 304, the method comprises transmitting an indication of the estimated gain value to a network node.

In some examples, the network node may indicate to the wireless device which wide beam to utilise as the first wide beam when calculating the estimated gain value for the first narrow beam. For example, the network node may transmit an indication of which beam is the first wide beam for use in calculating the estimated gain value for the first narrow beam.

Returning to FIG. 2, in step 202, the network node compares the obtained estimated gain value $G_{est}$ (either calculated by the network node or by the wireless device) to an expected gain value $G_{expected}$ associated with the first narrow beam. For example, the network node may subtract the estimated gain value $G_{est}$ from the expected gain value $G_{expected}$. Alternatively, the network node may calculate a ratio between the estimated gain value and the expected gain value.

The expected gain value $G_{expected}$ may comprise a gain value representative of the energy that is expected to be measured by the wireless device on the first narrow beam. This expected gain value $G_{expected}$ may for example be based on the shape of the beams that are produced by the base station. For example, the expected gain value may comprise a maximum known energy of the first narrow beam minus the energy of the first wide beam in the direction of the first narrow beam.

In step 203, the network node, based on the comparison, determines whether to adjust which beams belonging to the candidate set of beams.

In some examples, step 203 comprises determining whether the magnitude of the difference between the estimated gain value $G_{est}$ and the expected gain value $G_{expected}$ is greater than a threshold value. In particular, in some examples, responsive to the difference between the estimated gain value $G_{est}$ and the expected gain value $G_{expected}$ being greater than a threshold value $T_0$, the network node adjusts which beams belonging to the candidate set of beams.

In some examples, step 203 comprises determining whether the ratio between the estimated gain value and the expected gain value crosses a second threshold value.

For example, if $G_{expected}-G_{est}>T_0$, the network node may adjust the set of candidate beams. For example, the network node may add a second narrow beam to the set of candidate beams. For example, the second narrow beam may be a child beam of the first wide beam.

In other words, if the value indicative of the received energy of a candidate beam (e.g. the first narrow beam) is too low compared to the value indicative of the received energy of the corresponding wide beam (e.g. the first wide beam) at the wireless device's position, this indicates that a better path than the one currently used by the candidate beam is available within the wide beam. Hence, it is likely that the candidate beam in question is sub-optimal, and therefore the network node may add other data beams within the same wide beam to the set of candidate beams so that they can be tested.

In some examples, as the candidate beam that is the first narrow beam may be considered sub-optimal, the step of adjusting may comprise removing the first narrow beam from the set of candidate beams.

However, in some examples, whilst the candidate beam that is the first narrow beam may be considered sub-optimal, the wireless device may have made measurements on other candidate beams which were not reported to the network node. The network node may therefore assume that the non-reported beams comprise worse candidate beams than the reported first narrow beam. In some examples therefore, the step of adjusting may comprise removing a non-reported narrow beam from the set of candidate beams.

Figure 4:
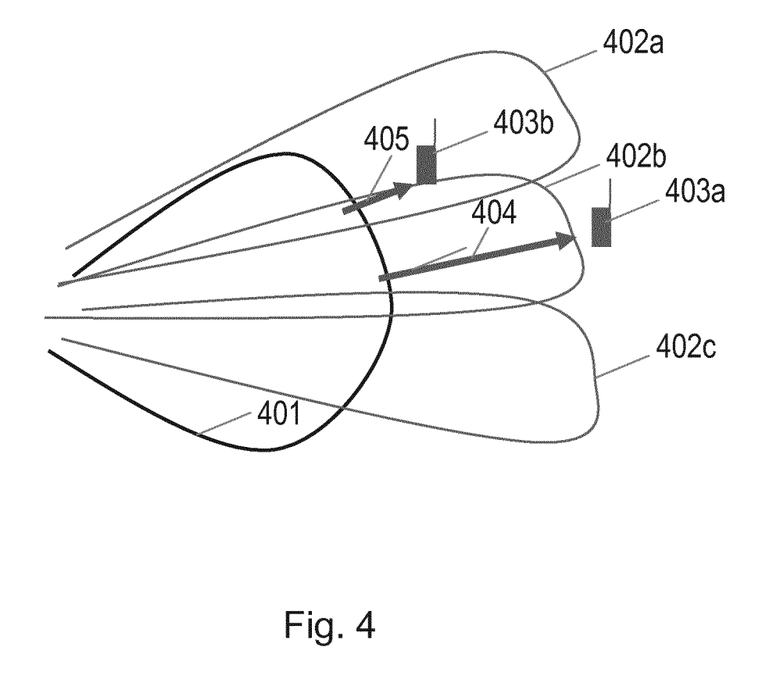
FIG. 4 illustrates an example of how the method of FIG. 2 may be implemented.

FIG. 4 illustrates an example of how the method of FIG. 2 may be implemented.

In this example, a base station provides a wide beam 401, and three narrow beams 402a, 402b and 402c which are all child beams of the wide beam 401.

Two wireless devices 403a and 403b are illustrated.

At first, the narrow beam 402b is a candidate beam for both the wireless device 403a and 403b. The arrow 404 represents the estimated gain $G_{est}$ of the narrow beam 402b for the wireless device 403a. An expected gain $G_{expected}$ of the narrow beam 302b may be similar to this gain, and therefore the beam 402b may be a suitable candidate for the wireless device 403a.

However, the estimated gain $G_{est}$ of the narrow beam 402b for the wireless device 403b is represented by the arrow 405. This arrow 405 is smaller than the arrow 404, and would be smaller than the expected gain $G_{expected}$ for the narrow beam 402b. In particular, the magnitude of the difference between the expected gain $G_{expected}$ for the narrow beam 402b and the estimated gain $G_{est}$ represented by the arrow 405 may be greater than a threshold value $T_0$. In this example therefore, the wireless device 403b may benefit from testing one of the other narrow beams.

In this example therefore, in step 203 of the method illustrated in FIG. 2, the network node may add another child beam, for example beam 402a to the set of candidate beams for the wireless device 403b. In some examples, the network node may remove the narrow beam 402b from the set of candidate beams for the wireless device 403b.

Figure 5:
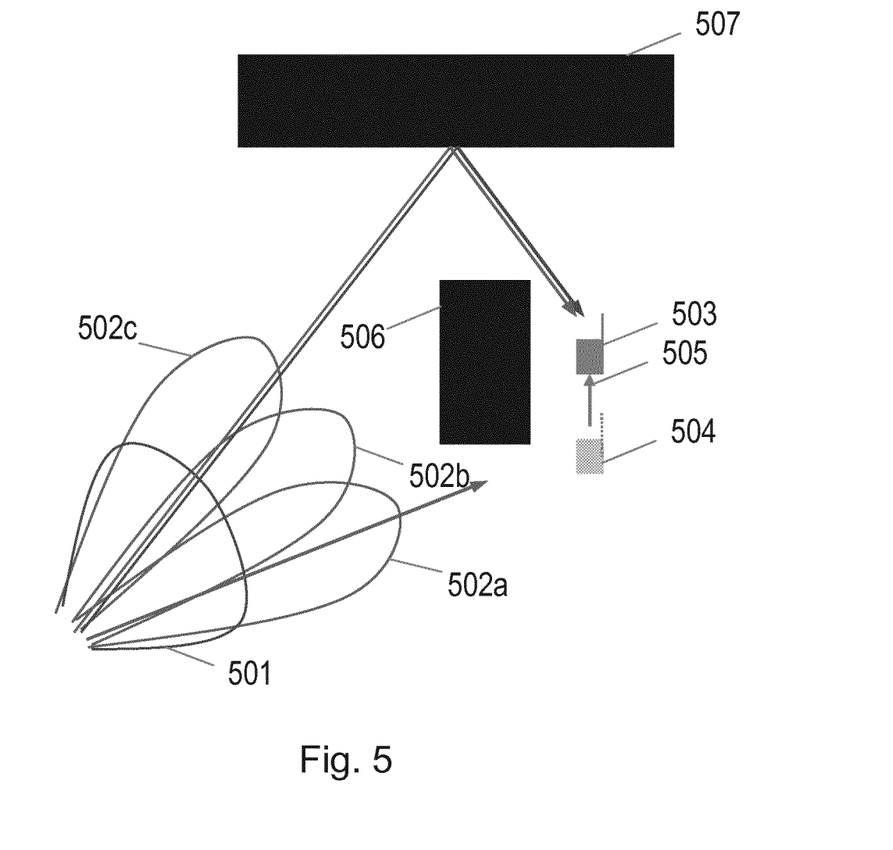
FIG. 5 illustrates an example of how the method of FIG. 2 may be implemented.

FIG. 5 illustrates another example of how the method of FIG. 2 may be implemented.

In this example a base station provides a wide beam 501 and three narrow beams 502a to 502c. In this example the narrow beams 502a to 502c are all child beams of the wide beam 501. A wireless device 503 starts at position 504 and moves to position 505.

In position 504, the narrow beam 502a may provide the best candidate beam for communication with the wireless device 503, as the received energy in the direction of the wireless device in position 504 in the narrow beam 502a is high. However, as the wireless device 503 moves behind an object 506 into position 505 behind an object 506, the energy received by the wireless device from the narrow beam 502a may drop substantially as the line of sight between the beam 502a and the wireless device 503 is obstructed by the object 506.

However, the energy received by the wide beam 501 may still be high, as the signal received on the wide beam 501 may be reflected off another object 507, and received by the wireless device 503.

In this circumstance therefore, as the wireless device 503 moves into position 505, the network node may receive measurements from the wireless device indicating that the energy received on the narrow beam 502a has dropped. In particular, the magnitude of the difference between the estimated gain and the expected gain may be greater than a threshold value.

The network node may then add one or more other narrow beams to the set of candidate beams. For example, the network node may add the beam 502b and/or 502c to the set of candidate beams. In doing this, the network node may discover that the narrow beam 502c may provide a better alternative for communication with the wireless device, as the signal transmitted by the narrow beam 502c may be reflected off the object 507 to reach the wireless device 503.

Figure 6:
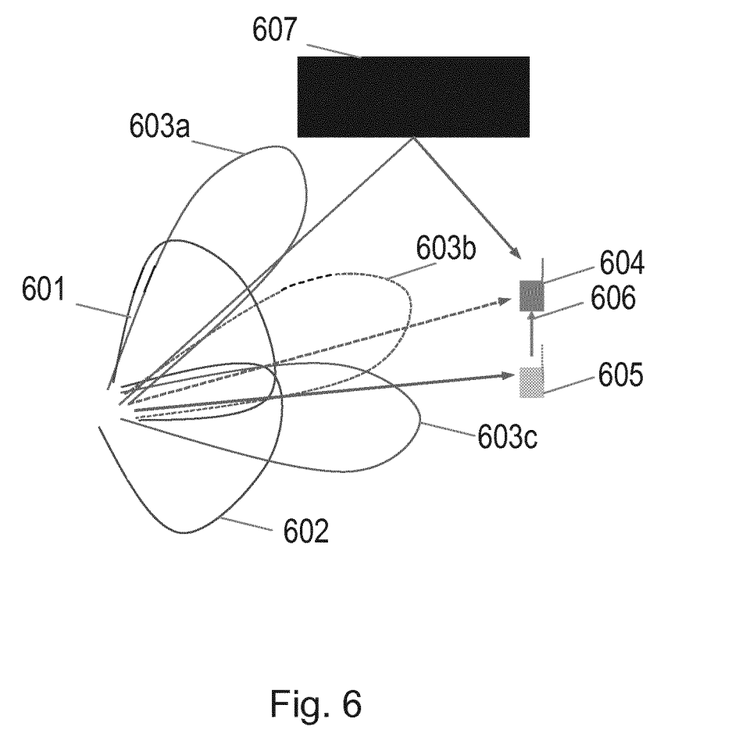
FIG. 6 illustrates an example of how the method of FIG. 2 may be implemented.

FIG. 6 illustrates another example of how the method of FIG. 2 may be implemented.

In this example a base station provides a first wide beam 601 and a second narrow beam 602. Three narrow beams 603a to 603c are provided. In this example the narrow beams 603a and 603b are child beams of the first wide beam 601. The narrow beam 603c is a child beam of the second wide beam 602. A wireless device 604 starts at position 605 and moves to position 606. Initially the set of candidate beams comprises the narrow beam 603a and the narrow beam 603c.

In position 605, the narrow beam 603c may provide a suitable beam for communication with the wireless device 604. However, as the wireless device 604 moves to position 606, the magnitude of the difference between the estimated gain and the expected gain for the beam 603c increases, and the narrow beam 603c may become unsuitable.

However, the other candidate beam 603a may also be sub-optimal due to a difference between the estimated gain and the expected gain of 603a. In other words, the signal received from the candidate beam 603a that is reflected off the object 607 may not be of high enough energy. The network node may therefore adjust the set of candidate beams to include the beam 603b. The beam 603b may be considered suitable for communication with the wireless device in position 606.

Consider an example in which a wireless device provides a report containing information relating to the received energy on only one candidate beam, B. In this example, if the received energy on the parent beam $S_B$ of B is higher than the received energy on other wide beams, the best reported beam B may still be considered as the best beam for communication with the wireless device. However, if B does not have a reasonable directivity gain compared to $S_B$, e.g. if $G_{expected} - G_{est} > T_0$, then the network node may adjust the set of candidate beams. In particular, a next beam sweep may include one or several siblings to B. For example, either a full sweep of the child beams of the parent beam $S_B$ may be initiated, or sibling beams B may be tested in a round robin scheme (possibly including the old best beam B) over multiple beam sweeps until a better beam is found.

For example, the step of adjusting in step 203 of FIG. 2 may comprise performing a beam sweep of a set of narrow beams and requesting that the wireless device provides a measurement report on said set of narrow beams; and adding a best reported narrow beam from the beam sweep to the set of candidate beams. In some examples, the set of narrow beams comprises child beams of the first wide beam. However, in some examples, the set of narrow beams in the beam sweep comprises narrow beams which are not sibling beams of the first narrow beam.

If the received energy on the parent beam $S_B$ is less than the received energy on another wide beam $S_X$, then it may be possible that the best beam for communication with the wireless device is not a sibling beam of B. In this example, one or more child beams of $S_X$ may be added to the set of candidate beams. In other words, in some examples, responsive to an indication of a value indicative of a third received energy of a third reference signal received by the wireless device on a second wide beam being greater than the value indicative of the first received energy, the network node may add one or more child beams of the second wide beam to the set of candidate beams.

It will be appreciated that the network node may perform the method as described with reference to FIG. 2 for each beam reported by the wireless device. For example, the network node may determine a plurality of estimated gain values associated with a plurality of narrow beams in the set of candidate beams. In some examples the plurality of narrow beams are all child beams of the first wide beam. However, in some examples, the plurality of narrow beams comprises at least one child beam of the first wide beam and at least one child beam of a second wide beam. In other words, in some examples the set of candidate beams may not all be child beams of the same wide beam.

In some examples therefore, responsive to a magnitude of a difference between any of the respective estimated gain values and an expected gain value for the respective narrow beam being greater than a respective threshold value, the network node may add a third narrow beam to the set of candidate beams, wherein the third narrow beam is a sibling beam of the respective narrow beam. For example, if any of the narrow beams reported by the wireless device meet the condition $G_{expected}-G_{est}>T_0$, then the network node may add a sibling beam of that narrow beam to the set of candidate beams.

Similarly, responsive to the magnitude of the difference between any of the respective estimated gain values and the expected gain value for the respective narrow beam being greater than the respective threshold value (e.g $G_{expected}-G_{est}>T_0$), the network node may remove the respective narrow beam from the set of candidate beams.

However, in some examples, as described above, whilst a candidate beam that meets the condition $G_{expected}-G_{est}>T_0$ may be considered sub-optimal, the wireless device may have made measurements on other candidate beams which were not reported to the network node. In some examples therefore, responsive to the magnitude of the difference between any of the respective estimated gain values and the expected gain value for the respective narrow beam being greater than the respective threshold value, the network node may remove a non-reported narrow beam form the set of candidate beams.

Consider an example in which a wireless device provides a report containing information relating to the received energy on a plurality of candidate beams which are all child beams of the same wide beam.

In this example, if any of the reported candidate beams fulfill the $G_{expected}-G_{est}>T_0$ requirement, they may be exchanged for another sibling beam not currently included in the set of candidate beams. It should be noted that any non-reported sibling beams currently in the candidate set will have lower received energy measured by the wireless device, (for example, the wireless device may be able to report a maximum of four beams from the candidate set) and therefore would evaluate even worse against the set threshold. In some examples therefore, responsive to the difference between any of the respective estimated gain values and the expected gain value for the respective narrow beam being greater than the respective threshold value, the network node may remove a non-reported narrow beam from the set of candidate beams.

Consider an example in which a wireless device provides a report containing information relating to the received energy on a plurality of candidate beams, wherein at least one of the candidate beams is a child beam of a first wide beam and at least one of the candidate beams is a child beam of a second wide beam.

This example may be described as an adaptive sparse sweep of narrow beams that are child beams of wide beams providing SSBs to the wireless device that have received energies that are considered interesting (e.g. based on reported RSRP being high enough or close enough to current best SSB).

The reported candidate beams may be evaluated by the network node as to whether or not they meet the condition $G_{expected}-G_{est}>T_0$. When the condition is not fulfilled, a sibling beam of the corresponding narrow beam may be added to the set of candidate beams. In some examples, the corresponding narrow beam may be removed from the set of candidate beams. In some examples, responsive to the difference between any of the respective estimated gain values and the expected gain value for the respective narrow beam being greater than the respective threshold value, the network node may remove a non-reported sibling of the corresponding narrow beam from the set of candidate beams.

Consider an example in which a set of candidate beams is shared by one or more wireless device.

In this example, if for a particular wireless device the condition $G_{expected}-G_{est}>T_0$ is fulfilled for a reported beam B, the step of adjusting may comprise initiating a beam sweep of child beams of the first wide beam and request a measurement report from the wireless device; and adding the best reported beam from the beam sweep to the set of candidate beams.

If the magnitude of the gain difference between $G_{expected}$ and $G_{est}$ increases, or if the reported beam B is not reported among a number of best beams for any of the wireless devices sharing the set of candidate beams for a certain time interval, the reported beam B may be removed from the set of candidate beams For example, the method of FIG. 2 may comprise, responsive to the first narrow beam not being reported among a predetermined number of best beams for any of the plurality of wireless devices for a predetermined time interval, removing the first narrow beam from the set of candidate beams.

Figure 7:
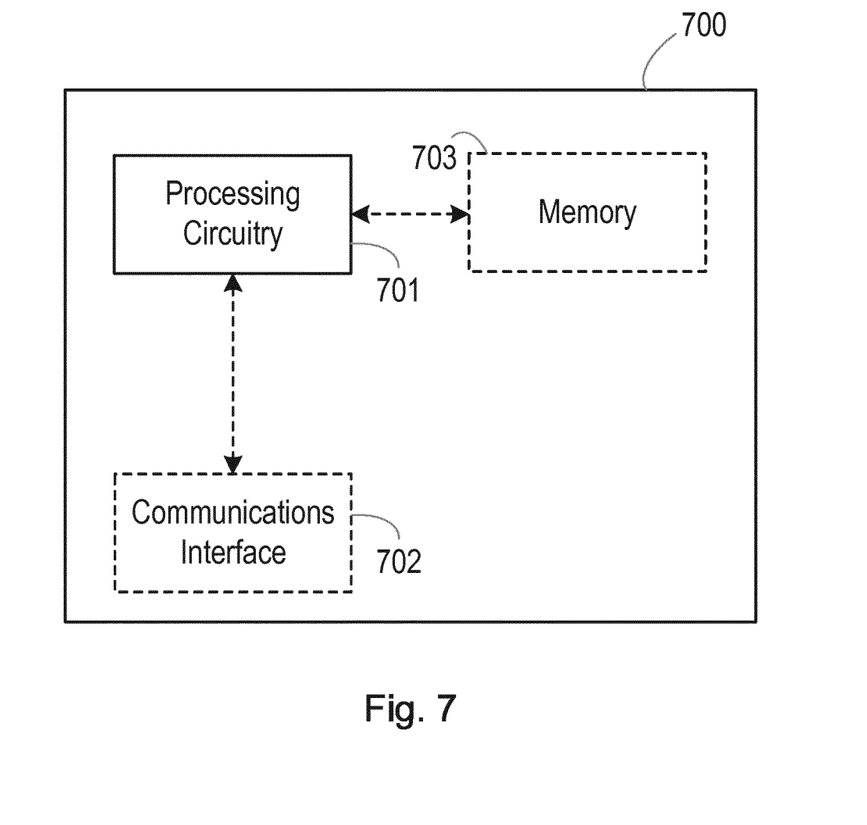
FIG. 7 illustrates a network node comprising processing circuitry (or logic)

FIG. 7 illustrates a network node 700 comprising processing circuitry (or logic) 701. The processing circuitry 701 controls the operation of the network node 700 and can implement the method described herein in relation to a network node 700 (e.g. a base station or network node). The processing circuitry 701 can comprise one or more processors, processing units, multi-core processors or modules that are configured or programmed to control the network node 700 in the manner described herein. In particular implementations, the processing circuitry 701 can comprise a plurality of software and/or hardware modules that are each configured to perform, or are for performing, individual or multiple steps of the method described herein in relation to the network node 700.

Briefly, the network node 700 is configured to: obtain an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam; compare the estimated gain value to an expected gain value associated with the first narrow beam; and based on the comparison, determine whether to adjust which beams belonging to the candidate set of beams.

In some embodiments, the network node 700 may optionally comprise a communications interface 702. The communications interface 702 of the network node 700 can be for use in communicating with other nodes, such as other virtual nodes. For example, the communications interface 702 of the network node 700 can be configured to transmit to and/or receive from other nodes requests, resources, information, data, signals, or similar. The processing circuitry 701 of network node 700 may be configured to control the communications interface 702 of the network node 700 to transmit to and/or receive from other nodes requests, resources, information, data, signals, or similar.

Optionally, the network node 700 may comprise a memory 703. In some embodiments, the memory 703 of the network node 700 can be configured to store program code that can be executed by the processing circuitry 701 of the network node 700 to perform the method described herein in relation to the network node 700. Alternatively or in addition, the memory 703 of the network node 700, can be configured to store any requests, resources, information, data, signals, or similar that are described herein. The processing circuitry 701 of the network node 700 may be configured to control the memory 703 of the network node 700 to store any requests, resources, information, data, signals, or similar that are described herein.

Figure 8:
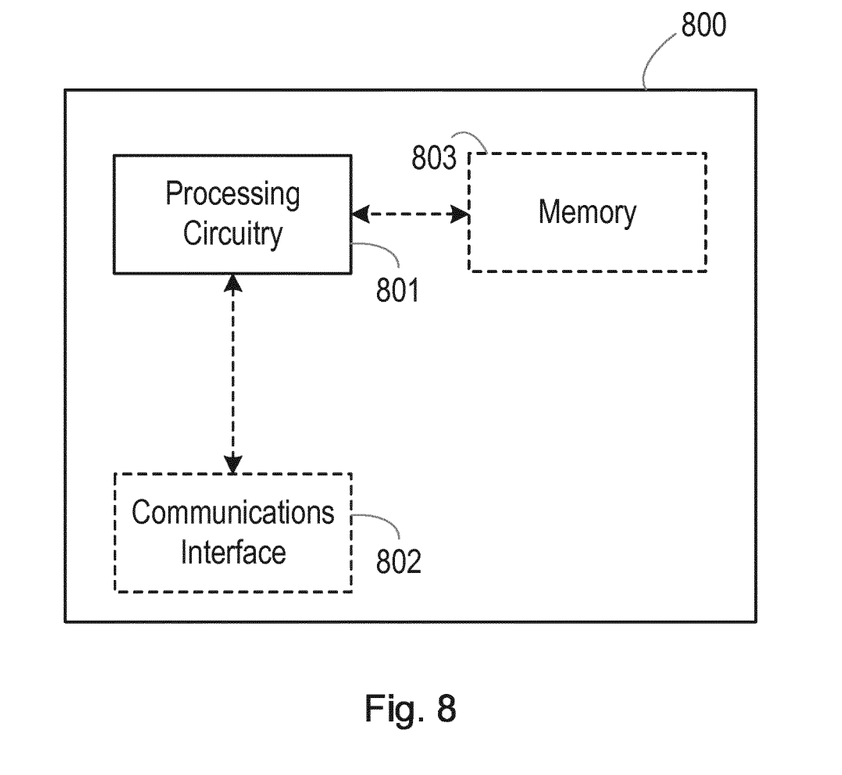
FIG. 8 illustrates a wireless device comprising processing circuitry (or logic).

FIG. 8 illustrates a wireless device 800 comprising processing circuitry (or logic) 801. The processing circuitry 801 controls the operation of the wireless device 800 and can implement the method described herein in relation to a wireless device 800. The processing circuitry 801 can comprise one or more processors, processing units, multi-core processors or modules that are configured or programmed to control the wireless device 800 in the manner described herein. In particular implementations, the processing circuitry 801 can comprise a plurality of software and/or hardware modules that are each configured to perform, or are for performing, individual or multiple steps of the method described herein in relation to the wireless device 800.

Briefly, the wireless device 800 is configured to measure a value indicative of a first received energy of a first reference signal received by the wireless device on a first wide beam; measuring a value indicative of a second received energy of a second reference signal received by the wireless device on a first narrow beam; calculate an estimated gain value associated with a first narrow beam based on the value indicative of the first received energy and the value indicative of the second received energy; and transmit an indication of the estimated gain value to a network node.

In some embodiments, the wireless device 800 may optionally comprise a communications interface 802. The communications interface 802 of the wireless device 800 can be for use in communicating with other nodes, such as other virtual nodes. For example, the communications interface 802 of the wireless device 800 can be configured to transmit to and/or receive from other nodes requests, resources, information, data, signals, or similar. The processing circuitry 801 of wireless device 800 may be configured to control the communications interface 802 of the wireless device 800 to transmit to and/or receive from other nodes requests, resources, information, data, signals, or similar.

Optionally, the wireless device 800 may comprise a memory 803. In some embodiments, the memory 803 of the wireless device 800 can be configured to store program code that can be executed by the processing circuitry 801 of the wireless device 800 to perform the method described herein in relation to the wireless device 800. Alternatively or in addition, the memory 803 of the wireless device 800, can be configured to store any requests, resources, information, data, signals, or similar that are described herein. The processing circuitry 801 of the wireless device 800 may be configured to control the memory 803 of the wireless device 800 to store any requests, resources, information, data, signals, or similar that are described herein.

Advantages of the embodiments described herein include providing a response as to whether or not a good beam candidate has been selected from the children beams of a wide beam, without actually transmitting any more data beams grouped under said wide beam (parent beam). The result is less signaling overhead for beam management resources, and less resources being required to determine if a current beam is suitable. Embodiments described herein may also have an energy saving effect (less signaling and more resources left for data) and cause less interference in neighboring cells from beam sweeps.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for adjusting a set of candidate beams that a wireless device is to perform measurements on, the method comprising:
   obtaining an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam;
   comparing the estimated gain value to an expected gain value associated with the first narrow beam, wherein comparing the estimated value to the expected gain value associated with the first narrow beam comprises calculating a ratio between the estimated gain value and the expected gain value; and
   based on the comparison, determining whether to adjust which beams belonging to the candidate set of beams.

2. The method as claimed in claim 1 wherein the step of obtaining comprises determining the estimated gain value.

3. The method as claimed in claim 2 further comprising:
   receiving a report from the wireless device comprising an indication of the value indicative of first received energy and the value indicative of the second received energy.

4. The method as claimed in claim 1, wherein the step of comparing further comprises:
   subtracting the estimated gain value from the expected gain value.

5. The method as claimed in claim 4 wherein the step of determining whether to adjust which beams belong to the candidate set of beams comprises at least one of:
   determining whether a magnitude of the difference between the estimated gain value and the expected gain value is greater than a first threshold value; and
   determining whether the ratio between the estimated gain value and the expected gain value crosses a second threshold value.

6. The method as claimed in claim 5 further comprising:
   responsive to at least one of: the magnitude of the difference between the estimated gain value and the expected gain value being greater than the first threshold value, and the ratio between the estimated gain value and the expected gain value crossing the second threshold value, adjusting which beams belonging to the candidate set of beams.

7. The method as claimed in claim 6 wherein the step of adjusting comprises:
   adding a second narrow beam to the set of candidate beams.

8. The method as claimed in claim 7 wherein the second narrow beam is a child beam of the first wide beam.

9. The method of claim 1 further comprising:
   determining a plurality of estimated gain values associated with a plurality of narrow beams in the set of candidate beams.

10. The method of claim 9 wherein the plurality of narrow beams are all child beams of the first wide beam.

11. The method of claim 9 wherein the plurality of narrow beams comprise at least one child beam of the first wide beam and at least one child beam of a second wide beam.

12. The method of claim 1 further comprising:
responsive to an indication of a value indicative of a third received energy of a third reference signal received by the wireless device on a second wide beam being greater than the value indicative of the first received energy, adding one or more child beams of the second wide beam to the set of candidate beams.

13. The method as claimed in claim 1 further comprising:
transmitting, to the wireless device, an indication of any adjustment made to the set of candidate beams.

14. A network node for adjusting a set of candidate beams that a wireless device is to perform measurements on, the network node comprising a processing circuitry and a memory, said memory containing instructions executable by said processing circuitry whereby said network node is operative to:
obtain an estimated gain value associated with a first narrow beam in the set of candidate beams, wherein the estimated gain value is determined based on a value indicative of first received energy of a first reference signal received by the wireless device on a first wide beam and a value indicative of a second received energy of a second reference signal received by the wireless device on the first narrow beam;
compare the estimated gain value to an expected gain value associated with the first narrow beam, wherein said network node is configured to perform the step of comparing by calculating a ratio between the estimated gain value and the expected gain value; and
based on the comparison, determine whether to adjust which beams belonging to the candidate set of beams.

15. The network node as claimed in claim 14 configured to perform the step of obtaining by determining the estimated gain value.

16. The network node as claimed in claim 15 configured to:
receive a report from the wireless device comprising an indication of the value indicative of first received energy and the value indicative of the second received energy.

17. The network node as claimed in claim 14, further configured to perform the step of comparing by:
subtracting the estimated gain value from the expected gain value.

18. The network node as claimed in claim 17 configured to perform the step of determining whether to adjust which beams belong to the candidate set of beams by at least one of:
determining whether a magnitude of difference between the estimated gain value and the expected gain value is greater than a first threshold value; and
determining whether the ratio between the estimated gain value and the expected gain value crosses a second threshold value.

19. The network node of claim 14 configured to:
responsive to an indication of a value indicative of a third received energy of a third reference signal received by the wireless device on a second wide beam being greater than the value indicative of the first received energy, add one or more child beams of the second wide beam to the set of candidate beams.

20. The network node as claimed in claim 14 further configured to:
transmit, to the wireless device, an indication of any adjustment made to the set of candidate beams.

* * * * *